United States Patent
Banaszak et al.

(10) Patent No.: US 7,477,181 B2
(45) Date of Patent: Jan. 13, 2009

(54) METHOD OF ADAPTIVELY ADJUSTING THE TARGET DETECTION SENSITIVITY OF A MOTOR VEHICLE RADAR

(75) Inventors: Thomas J. Banaszak, Kokomo, IN (US); Boris I. Ilicic, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/706,017

(22) Filed: Feb. 14, 2007

(65) Prior Publication Data

US 2008/0191930 A1 Aug. 14, 2008

(51) Int. Cl.
*G01S 13/08* (2006.01)
(52) U.S. Cl. .................................... 342/70; 342/93
(58) Field of Classification Search .................... 342/93, 342/92, 91
See application file for complete search history.

(56) References Cited

U.S. PATENT DOCUMENTS

| | | | |
|---|---|---|---|
| 3,171,119 A | | 2/1965 | Okurowski et al. |
| 4,829,490 A | * | 5/1989 | Parker .......................... 367/98 |
| 5,150,334 A | * | 9/1992 | Crosby .......................... 367/98 |
| 5,357,256 A | * | 10/1994 | Peperone ....................... 342/91 |
| 6,229,475 B1 | * | 5/2001 | Woolley ........................ 342/93 |
| 6,411,250 B1 | * | 6/2002 | Oswald et al. ................. 342/93 |
| 6,433,730 B1 | * | 8/2002 | Borla ............................ 342/91 |
| 6,456,231 B1 | * | 9/2002 | McEwan ....................... 342/93 |
| 6,583,754 B2 | * | 6/2003 | Mertins et al. ................. 342/70 |
| 6,717,545 B2 | * | 4/2004 | Dizaji et al. .................... 342/93 |
| 2002/0084930 A1 | * | 7/2002 | Bauhahn ........................ 342/70 |
| 2003/0080895 A1 | * | 5/2003 | Mertins et al. .............. 342/104 |
| 2003/0174088 A1 | * | 9/2003 | Dizaji et al. .................... 342/93 |
| 2004/0090362 A1 | * | 5/2004 | Zimmermann et al. ........ 342/70 |
| 2004/0130702 A1 | * | 7/2004 | Jupp et al. ................... 356/5.01 |
| 2004/0246124 A1 | * | 12/2004 | Reilly et al. ................. 340/511 |
| 2005/0180530 A1 | * | 8/2005 | Reiche ......................... 375/317 |
| 2008/0191930 A1 | * | 8/2008 | Banaszak et al. .............. 342/93 |

FOREIGN PATENT DOCUMENTS

| | | |
|---|---|---|
| EP | 1 562 050 | 8/2005 |
| WO | 02/054099 | 7/2002 |
| WO | 03/046605 | 6/2003 |

OTHER PUBLICATIONS

European Search Report dated Jun. 16, 2008.

* cited by examiner

*Primary Examiner*—Dan Pihulic
(74) *Attorney, Agent, or Firm*—Douglas D. Fekete

(57) ABSTRACT

The factory-calibrated target discrimination threshold of a radar-based motor vehicle back-up aid is adaptively lowered under specified vehicle operating conditions to provide enhanced target detection sensitivity without causing false target detection. The threshold is initialized to the calibrated value on transition to the reverse range, and is thereafter subject to adaptive adjustment so long as a target is not detected and a high-clutter condition is not in effect. The adaptive adjustment is carried out by low-pass filtering the resultant data of the radar sensor, starting with a factory-calibrated noise baseline, to determine the current noise level, and then calculating the threshold from the noise level. The adaptive adjustment is suspended for an interval after target detection, and the threshold is increased when a high clutter condition is detected based on rate of change in vehicle speed.

7 Claims, 3 Drawing Sheets

METHOD OF ADAPTIVELY ADJUSTING THE TARGET DETECTION SENSITIVITY OF A MOTOR VEHICLE RADAR

TECHNICAL FIELD

The present invention relates to a radar-based back-up and parking aid for a motor vehicle, and more particularly to a method of adaptively setting a radar signal threshold for discriminating targets (i.e., objects of interest) from background clutter.

BACKGROUND OF THE INVENTION

Motor vehicles can be equipped with a radar-based back-up and parking aid (BUA) such as the Dual-Beam Radar Back-Up Aid produced by Delphi Corporation for producing audible and/or visual driver alerts when an obstacle is detected in the rear travel path of the vehicle. In a typical installation, the system includes a radar sensor module mounted in a protected location behind a plastic fascia that covers the rear bumper. Although the bumper fascia protects the sensor module from physical damage and environmental contamination, it can also increase the effective level of clutter or noise detected by the sensor, particularly under conditions that cause the fascia to shift or flex. Since this and other clutter can be falsely interpreted as an obstacle and result in false target detection, the target discrimination threshold is customarily set to relatively high level for maximum noise rejection. Unfortunately, this can also unnecessarily limit the target detection sensitivity of the system because the same target discrimination threshold is used under all conditions. Accordingly, what is needed is a way of improving the target detection sensitivity without causing false target detection.

SUMMARY OF THE INVENTION

The present invention provides an improved method of operation for a radar-based motor vehicle BUA in which a calibrated target discrimination threshold is adaptively lowered under specified vehicle operating conditions to provide enhanced target detection sensitivity without causing false target detection. The threshold is initialized to a calibrated value on transition to the reverse range, and is thereafter subject to adaptive adjustment for increased target detection sensitivity so long as a target is not detected and a high-clutter condition is not in effect. The adaptive adjustment is carried out by low-pass filtering the resultant data of the radar sensor, starting with a factory-calibrated noise baseline, to determine the current noise level, and then calculating threshold from the determined noise level. The adaptive adjustment is suspended for a calibrated interval after target detection, and the threshold is increased when a high clutter condition is detected based on rate of change in vehicle speed.

DESCRIPTION OF THE PREFERRED EMBODIMENT

Figure 1:
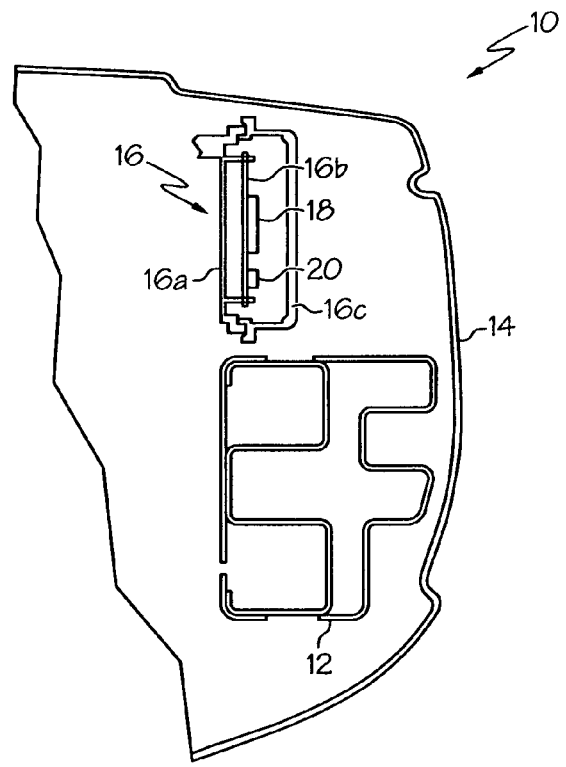
FIG. 1 is a cross-sectional diagram of a vehicle bumper and radar-based BUA.

Referring to the drawings, and particularly to FIG. 1, the reference numeral 10 generally designates a motor vehicle, including a bumper frame 12, a molded plastic bumper fascia 14, and a radar-based BUA module 16. In the illustrated embodiment, a housing 16a of BUA module 16 is fastened to a vehicle frame element (not shown) above bumper frame 12. The electronic components of BUA 16, including a radar sensor 18 and a microprocessor-based signal processor 20, are mounted on a circuit board 16b, and a radome 16c fastened to the housing 16a encloses and environmentally seals the circuit board 16b and the electronic components 18 and 20. In use, the radar sensor 18 illuminates a defined area in the rear travel path of vehicle 10, and quantifies the reflected signal by range bin to form resultant data for comparison with a target discrimination threshold. A target is detected when the resultant data exceeds the threshold, and the presence or absence of targets over a prescribed period of time is analyzed to determine if a driver warning should be issued.

The BUA 16 is initially calibrated for vehicle 10 at the vehicle factory. For example, the calibration process may involve setting the signal processor 20 in a calibration mode and placing a standard target in the center of the target detection zone at a predetermined distance from vehicle 10. After placement of the target, the radar sensor 18 is activated to illuminate the detection zone, and the signal processor 20 sets the target detection threshold CAL_THR based on the radar return signal.

In subsequent operation of the BUA 16, the factory-calibrated threshold (CAL_THR) is used to form a target discrimination threshold that is suitable for real-world environments (as compared to the factory-calibration environment). For example, one conventional technique is to multiply CAL_THR by a gain factor that effectively increases CAL_THR by approximately 6 dB. However, setting the target discrimination threshold to such a fixed value tends to unnecessarily reduce the target detection sensitivity under most conditions.

The method of the present invention also utilizes the factory-calibrated target discrimination threshold CAL_THR, but determines the real-world target discrimination threshold (referred to herein as the adaptive threshold, or AD_THR) in a new way that adaptively increases target detection sensitivity without causing false target detection. In general, the signal processor 20 low-pass filters the resultant data in the absence of a target to determine noise baseline for the resultant data, and then determines AD_THR based on the filter output. Under most conditions, the AD_THR will be significantly lower than CAL_THR, and the target detection sensitivity of BUA 16 will be correspondingly improved.

Figure 2:
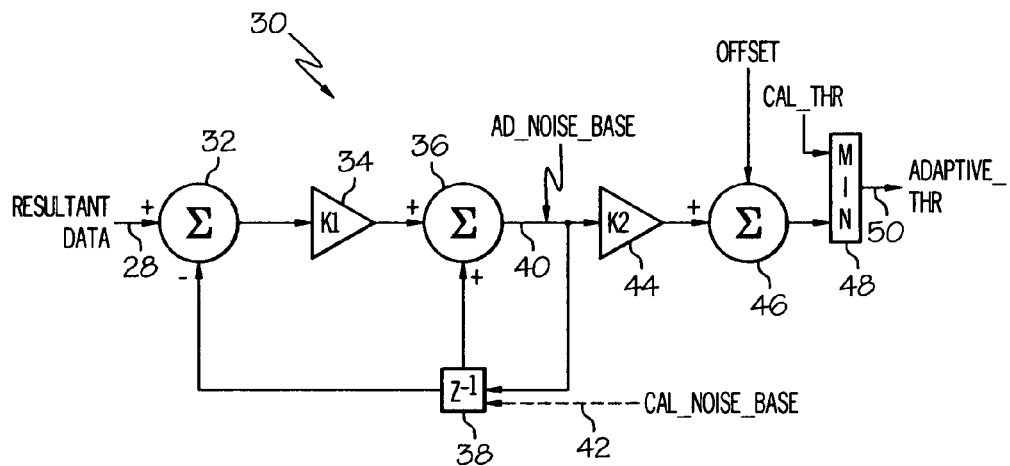
FIG. 2 is a block diagram illustrating an adaptive adjustment of the target discrimination threshold by the BUA of FIG. 1 according to this invention.

FIG. 2 illustrates the formation of AD_THR as a block diagram in which the resultant data is supplied as an input on line 28. A low-pass filter 30 comprising the blocks 32-38 filters the resultant data input, and the filter output (referred to herein as the adaptive noise baseline, or AD_NOISE_BASE) appears on line 40. Block 32 determines the sample-to-sample change in the resultant data, block 34 applies a filter time-constant K1 to the determined change, and block 36 sums the output of block 34 with the prior value of AD_NOISE_BASE, supplied by block 38. Broken line 42 signifies that the adaptive noise baseline can be reset to a noise baseline (CAL_NOISE_BASE) corresponding to the factory-calibrated target threshold CAL_THR, as described below in reference to FIGS. 3A-3B. The blocks 44-48 are responsive to the adaptive noise baseline on line 40, and produce the adaptive threshold AD_THR on line 50. Block 44 represents a threshold multiplier for increasing the adaptive noise baseline by a calibrated amount such as 6 dB, and block 46 applies a calibrated offset to the output of block 44. Block 48 is a minimum value function responsive to both CAL_THR and the output of block 46, and ensures that AD_THR will never exceed CAL_THR.

Figure 3A:
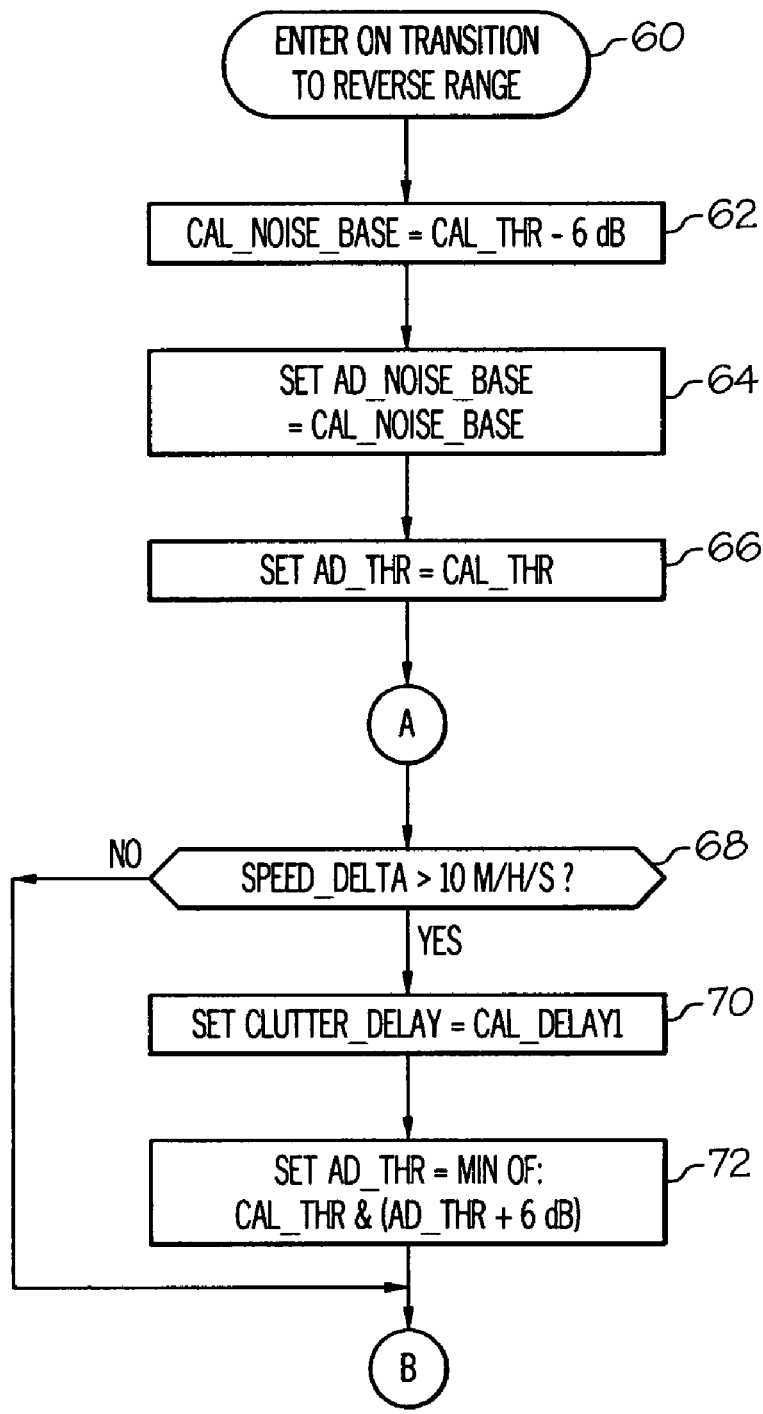
FIGS. 3A and 3B together depict a flow diagram representative of a method of operation carried out by the BUA of FIG. 1 according to this invention.
Figure 3B:
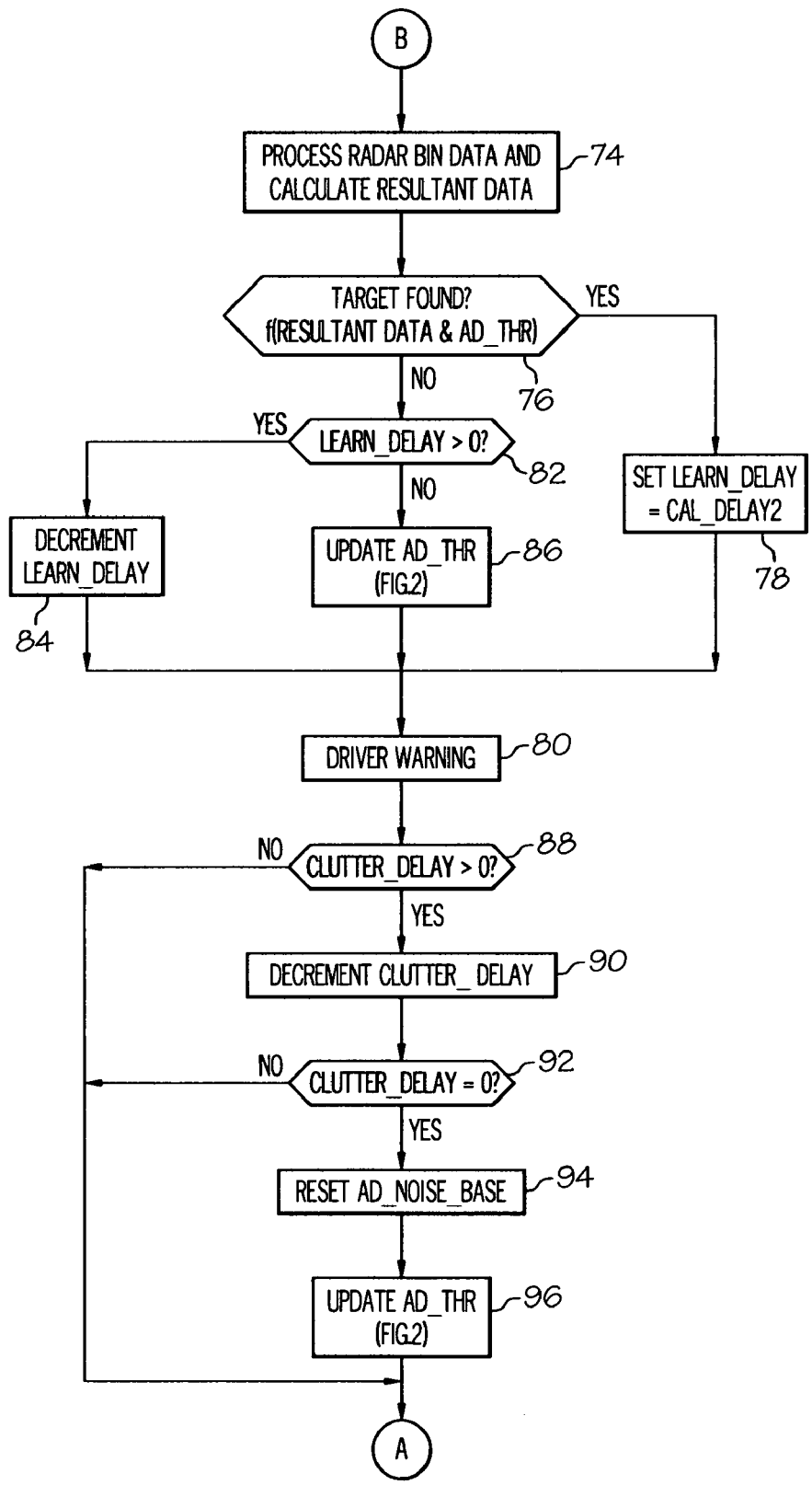

The flow diagram of FIGS. 3A-3B is representative of a software routine executed by signal processor 20 of BUA 16, and shows how the block diagram of FIG. 2 is utilized during reverse operation of the vehicle 10. As indicated at block 60, the flow diagram is entered when the reverse range of vehicle 10 is selected; the routine thereafter remains active so long as the reverse range is engaged.

In general, adaptive adjustment of the target threshold AD_THR occurs except when: (1) a target is detected, or (2) a high clutter condition is recognized. Targets are detected, of course, when the resultant data exceeds AD_THR; and once a target is detected, adaptive adjustment of AD_THR is suspended until no target is detected for a calibrated time. A high clutter condition is recognized by monitoring the rate of change in vehicle speed, since fast changes in vehicle speed result in shifting and flexing of the plastic bumper fascia 14 through which radar signals propagate. Once a high clutter condition is detected, AD_THR is increased to provide high noise rejection, and the low-pass filter 30 is reset after a period of time to re-commence adaptive adjustment of AD_THR.

Referring to FIG. 3A, blocks 62-66 are executed on entry of the routine, and initialize the adaptive parameters based on the factory-calibrated target discrimination threshold CAL_THR. Block 62 determines a noise baseline CAL_NOISE_BASE corresponding to CAL_THR by reducing CAL_THR by a specified amount such as 6 dB. Block 64 initializes AD_NOISE_BASE to CAL_NOISE_BASE (as mentioned above in reference to line 42 of the block diagram of FIG. 2), and block 66 initializes AD_THR to CAL_THR. Following initialization, the main loop of the routine comprising blocks 68-96 is repeatedly executed, as indicated by the circled letters A and B.

Blocks 68-72 detect and respond to a high clutter condition due to rapid acceleration or deceleration of the vehicle 10. Block 68 compares the change in vehicle speed (SPEED_DELTA) to a calibrated reference, such as 10 miles-per-hour-per-second. If SPEED_DELTA exceeds the reference, blocks 70 and 72 are executed to set a delay timer variable (CLUTTER_DELAY) to a calibrated number (CAL_DELAY1) and to set AD_THR to the lowest of CAL_THR and (AD_THR+6 dB). The delay timer variable CLUTTER_DELAY is decremented (by block 90, described below) on each execution of the main loop following detection of the high clutter condition, and effectively measures a time interval such as four (4) seconds. Block 72 returns AD_THR to a level that provides high noise rejection if it had been decreased through adaptive adjustment.

Referring to FIG. 3B, blocks 74 and 76 are then executed to process the received radar data and check for targets. The received radar data is processed by range bin to provide a resultant return (resultant data) for each range bin. If the resultant data exceeds AD_THR, a target is detected; otherwise no targets are detected. If block 76 is answered in the affirmative (i.e., target detected), block 78 sets a delay timer variable (LEARN_DELAY) to a calibrated number (CAL_DELAY2) to suspend adaptive adjustment of AD_THR, and block 80 executes a driver warning routine that determines if a driver warning should be issued. The driver warning routine is not particularly pertinent to the present invention, but typically involves tracking the target detection history and other factors such as the vehicle speed. Once a target is no longer detected, block 76 is answered in the negative, and block 82 checks the delay timer variable LEARN_DELAY to determine if adaptive adjustment of AD_THR is being delayed due to target detection. If LEARN_DELAY is greater than zero, adaptive adjustment of AD_THR is not permitted; in this case, block 84 decrements LEARN_DELAY and block 80 executes the driver warning routine. If block 82 is answered in the negative (i.e., LEARN_DELAY <=0), adaptive adjustment of AD_THR is permitted, and block 86 is executed to adaptively update AD_THR before executing the driver warning routine of block 80. Adaptive updating of AD_THR occurs as described above in reference to the block diagram of FIG. 2.

Finally, blocks 88-96 process the delay timer variable CLUTTER_DELAY following the detection of a high clutter condition by block 68. Blocks 88 and 90 serve to decrement CLUTTER_DELAY if its value is greater than zero. If CLUTTER_DELAY is still greater than zero, block 92 is answered in the negative, and the routine reverts to block 68 as indicated by the circled letter A. However, if decrementing CLUTTER_DELAY reduces its value to zero, block 92 is answered in the affirmative; in this case, block 94 resets the AD_NOISE_BASE of low-pass filter 30, and block 96 updates AD_THR. Resetting AD_NOISE_BASE at the conclusion of the CLUTTER_DELAY interval (i.e., at block 94) is necessary because block 72 resets AD_THR upon detection of the high clutter condition. Block 94 therefore resets AD_NOISE_BASE to a noise baseline value that corresponds to the reset value of AD_THR.

In summary, the target discrimination threshold AD_THR is initialized to a calibrated value on transition to the reverse range, and is thereafter subject to adaptive adjustment (i.e., learning) for increased target detection sensitivity so long as a target is not detected and the high clutter condition is not detected. The adaptive adjustment is carried out by low-pass filtering the resultant data of the radar sensor 18 (starting with the factory-calibrated noise baseline) to determine AD_NOISE_BASE and then calculating AD_THR from AD_NOISE_BASE. The adaptive adjustment is suspended when a target is detected, and for a calibrated interval (i.e., the time interval of LEARN_DELAY) after a target is no longer detected. And when a high clutter condition is detected, AD_THR is immediately increased (if previously lowered by adaptive adjustment), and the low-pass filter 30 is reset to re-commence adaptive adjustment of AD_THR when the clutter condition has not been detected for at least a calibrated interval (i.e., the time interval of CLUTTER_DELAY). In this way, AD_THR is progressively adjusted to the lowest level permitted by the current level of clutter or noise to thereby improve target detection sensitivity without causing false target detection.

While the method of this invention has been described with respect to the illustrated embodiment, it is recognized that numerous modifications and variations in addition to those mentioned herein will occur to those skilled in the art. For example, the method may also be applied to forward-looking radars, the low-pass filter 30 may be configured as a second or higher order filter in lieu of the illustrated first-order configuration, and so on. Accordingly, it is intended that the invention not be limited to the disclosed embodiment, but that it have the full scope permitted by the language of the following claims.

The invention claimed is:

1. A method of adaptively improving a target detection sensitivity of a motor vehicle radar that detects a target when a resultant signal of said radar exceeds a target discrimination threshold, comprising the steps of:
    setting said target discrimination threshold to the initial calibrated threshold;
    determining an initial noise baseline corresponding to said initial calibrated threshold;
    low-pass filtering said resultant radar signal, starting with said initial noise baseline, when no target is detected to form an adaptive noise baseline;
    periodically adjusting said target discrimination threshold to a new value based on said adaptive noise baseline; and
    suspending said low-pass filtering when said resultant signal exceeds said target discrimination threshold.

2. The method of claim 1, including the step of:
    re-commencing said low-pass filtering when no target is detected for at least a predetermined time.

3. The method of claim 1, including the steps of:
    detecting a condition associated with a high level of background clutter; and increasing the value of said target discrimination threshold upon detection of said condition.

4. The method of claim 3, including the step of:
    limiting the increasing of said target discrimination threshold as required to prevent said target discrimination threshold from exceeding said calibrated threshold.

5. The method of claim 3, where said condition is detected when a rate of change in vehicle speed exceeds a calibrated rate of change.

6. The method of claim 3, including the step of:
    suspending said low-pass filtering upon detection of said condition.

7. The method of claim 6, including the steps of:
    determining an new noise baseline corresponding to the increased value of said target discrimination threshold; and
    re-commencing said low-pass filtering said resultant radar signal, starting with said new noise baseline, when said condition has not been detected for at least a predetermined time.

* * * * *